(12) United States Patent
Cho et al.

(10) Patent No.: US 12,482,224 B2
(45) Date of Patent: Nov. 25, 2025

(54) ELECTRONIC DEVICE AND METHOD WITH SPATIO-TEMPORAL SELF-SIMILARITY CONSIDERATION

(71) Applicants: Samsung Electronics Co., Ltd., Suwon-si (KR); POSTECH Research and Business Development Foundation, Pohang-si (KR)

(72) Inventors: Minsu Cho, Pohang-si (KR); Heeseung Kwon, Pohang-si (KR); Manjin Kim, Pohang-si (KR); Suha Kwak, Pohang-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 419 days.

(21) Appl. No.: 17/977,449

(22) Filed: Oct. 31, 2022

(65) Prior Publication Data

US 2024/0153238 A1    May 9, 2024

(30) Foreign Application Priority Data

Nov. 25, 2021  (KR) .......................... 10-2021-0164497

(51) Int. Cl.
*G06V 10/74* (2022.01)
*G06T 7/246* (2017.01)
(Continued)

(52) U.S. Cl.
CPC ............ *G06V 10/761* (2022.01); *G06T 7/248* (2017.01); *G06T 7/74* (2017.01); *G06V 10/62* (2022.01);
(Continued)

(58) Field of Classification Search
CPC .... G06V 10/761; G06V 10/62; G06V 10/751; G06V 10/759; G06V 10/764;
(Continued)

(56) References Cited

U.S. PATENT DOCUMENTS 9,569,694 B2    2/2017  Othmezouri et al.
10,701,394 B1 *  6/2020  Caballero ............. G06N 3/045
(Continued)

FOREIGN PATENT DOCUMENTS

| CN | 106251289 A | 12/2016 |
| CN | 112637599 A | 4/2021 |
| KR | 10-2014-0135968 A | 11/2014 |

OTHER PUBLICATIONS

Liu et al., "Learning Video Representations From Correspondence Proposals," 2019 IEEE/CVF Conference on Computer Vision and Pattern Recognition (CVPR), Long Beach, CA, USA, 2019, pp. 4268-4276, doi: 10.1109/CVPR.2019.00440. (Year: 2019).*

(Continued)

*Primary Examiner* — Emily C Terrell
*Assistant Examiner* — Julia Z. Yao
(74) *Attorney, Agent, or Firm* — NSIP Law

(57) ABSTRACT

An electronic device using a spatio-temporal self-similarity (STSS) and a method of operating the electronic device are disclosed. The electronic device may generate an STSS tensor including a spatial self-similarity map and spatial cross-similarity maps for each position of a video feature map corresponding to an input video based on a temporal offset and a spatial offset. STSS feature vectors may be generated from the STSS tensor by decreasing a dimension of the spatial offset and maintaining a dimension of the temporal offset for each position of the STSS tensor. An STSS feature map may be generated by integrating the dimension of the temporal offset for each position of the (Continued)

STSS feature vectors. An inference on the input video may be based on a result of adding the STSS feature map to the video feature map.

24 Claims, 13 Drawing Sheets

(51) Int. Cl.

| | | |
|---|---|---|
| *G06T 7/73* | (2017.01) | |
| *G06V 10/62* | (2022.01) | |
| *G06V 10/75* | (2022.01) | |
| *G06V 10/764* | (2022.01) | |
| *G06V 10/77* | (2022.01) | |
| *G06V 10/82* | (2022.01) | |
| *G06V 40/20* | (2022.01) | |

(52) U.S. Cl.
CPC .......... *G06V 10/751* (2022.01); *G06V 10/759* (2022.01); *G06V 10/764* (2022.01); *G06V 10/7715* (2022.01); *G06V 10/82* (2022.01); *G06V 40/20* (2022.01); *G06T 2207/10016* (2013.01); *G06T 2207/20084* (2013.01)

(58) Field of Classification Search
CPC .... G06V 10/7715; G06V 10/82; G06V 40/20; G06V 10/454; G06V 20/46; G06T 7/248; G06T 7/74; G06T 2207/10016; G06T 2207/20084; G06T 2207/20081; G06T 2207/30196; G06T 2207/30241; G06T 7/246; G06N 3/049; G06N 3/082; G06N 3/084; G06N 5/04
See application file for complete search history.

(56) References Cited

U.S. PATENT DOCUMENTS

| | | | | |
|---|---|---|---|---|
| 2020/0034627 A1* | 1/2020 | Zhu | .................. | G06F 18/217 |
| 2020/0057935 A1* | 2/2020 | Wang | .................. | G06F 17/15 |
| 2020/0394412 A1* | 12/2020 | Carreira | .................. | G06V 10/454 |
| 2021/0012164 A1* | 1/2021 | Qiao | .................. | G06F 18/24 |
| 2023/0072445 A1* | 3/2023 | Liang | .................. | G06N 3/04 |
| 2023/0353828 A1* | 11/2023 | Wang | .................. | G06V 20/44 |
| 2025/0046121 A1* | 2/2025 | Paik | .................. | G06V 10/806 |

OTHER PUBLICATIONS

Shechtman et al., "Matching Local Self-Similarities across Images and Videos," 2007 IEEE Conference on Computer Vision and Pattern Recognition, Minneapolis, MN, USA, 2007, pp. 1-8, doi: 10.1109/CVPR.2007.383198. (Year: 2007).*

Zou et al., "Progressive Temporal Feature Alignment Network for Video Inpainting," 2021 IEEE/CVF Conference on Computer Vision and Pattern Recognition (CVPR), Nashville, TN, USA, 2021, pp. 16443-16452, doi: 10.1109/CVPR46437.2021.01618. (Year: 2021).*

Kwon et al. MotionSqueeze: Neural Motion Feature Learning for Video Understanding. In: Vedaldi, A., Bischof, H., Brox, T., Frahm, JM. (eds) Computer Vision—ECCV 2020. ECCV 2020. Lecture Notes in Computer Science(), vol. 12361. Springer, Cham. https://doi.org/10.1007/978-3-030-58517-4_21 (Year: 2020).*

Li et al., "TEA: Temporal Excitation and Aggregation for Action Recognition," 2020 IEEE/CVF Conference on Computer Vision and Pattern Recognition (CVPR), Seattle, WA, USA, 2020, pp. 906-915, doi: 10.1109/CVPR42600.2020.00099. (Year: 2020).*

Zhang et al., "Temporal Reasoning Graph for Activity Recognition," in IEEE Transactions on Image Processing, vol. 29, pp. 5491-5506, 2020, doi: 10.1109/TIP.2020.2985219. (Year: 2020).*

Kim et al., "Spatio-Temporal Slowfast Self-Attention Network for Action Recognition," 2020 IEEE International Conference on Image Processing (ICIP), Abu Dhabi, United Arab Emirates, 2020, pp. 2206-2210, doi: 10.1109/ICIP40778.2020.9191290. (Year: 2020).*

Ji et al., "CASNet: A Cross-Attention Siamese Network for Video Salient Object Detection," in IEEE Transactions on Neural Networks and Learning Systems, vol. 32, No. 6, pp. 2676-2690, Jun. 2021, doi: 10.1109/TNNLS.2020.3007534. (Year: 2021).*

D. Li et al., "ARVo: Learning All-Range Volumetric Correspondence for Video Deblurring," 2021 IEEE/CVF Conference on Computer Vision and Pattern Recognition (CVPR), Nashville, TN, USA, 2021, pp. 7717-7727, doi: 10.1109/CVPR46437.2021.00763. (Year: 2021).*

Z. Liu et al., "Superpixel-Based Spatiotemporal Saliency Detection," in IEEE Transactions on Circuits and Systems for Video Technology, vol. 24, No. 9, pp. 1522-1540, Sep. 2014, doi: 10.1109/TCSVT.2014.2308642. (Year: 2014).*

Ayvaci, Alper, et al. "Video upscaling via spatio-temporal self-similarity." *Proceedings of the 21st International Conference on Pattern Recognition (ICPR2012)*. IEEE, Nov. 11, 2012. pp. 2190-2193.

Wang, Limin, et al. "Temporal segment networks: Towards good practices for deep action recognition." *European conference on computer vision*. Springer, Cham, 2016. pp. 20-36.

Lin, Ji, Chuang Gan, and Song Han. "Tsm: Temporal shift module for efficient video understanding." *Proceedings of the IEEE/CVF International Conference on Computer Vision*. 2019. pp. 7083-7093.

* cited by examiner

ELECTRONIC DEVICE AND METHOD WITH SPATIO-TEMPORAL SELF-SIMILARITY CONSIDERATION

CROSS-REFERENCE TO RELATED APPLICATIONS

This application claims the benefit under 35 USC §119(a) of Korean Patent Application No. 10-2021-0164497 filed on Nov. 25, 2021, in the Korean Intellectual Property Office, the entire disclosure of which is incorporated herein by reference for all purposes.

BACKGROUND

1. Field

The following description relates to an electronic device and method with spatio-temporal self-similarity (STSS) consideration.

2. Description of Related Art

A three-dimensional (3D) convolutional neural network (CNN) may be used to learn 3D information in a video. The information may be motion information, for example. Optical flows may also be used to learn motion information in video. However, both 3D CNNs and optical flows are compute-intensive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electronic device includes a processor, and a memory including instructions that when executed by the processor configure the processor to generate a spatio-temporal self-similarity (STSS) tensor including, for respective positions of a video feature map, a spatial self-similarity map and spatial cross-similarity maps, wherein the video feature map corresponds to an input video, generate STSS feature vectors from the STSS tensor, generate an STSS feature map based on the STSS feature vectors, and perform an inference on the input video based on the STSS feature map.

The spatial self-similarity map may include similarities between a position in a frame of the input video and neighboring regions in the frame, and the spatial cross-similarity maps may include similarities between the position in the frame and respectively corresponding positions in other frames of the input video.

The processor may be configured to perform the inference based on adding the STSS feature map to the video feature map.

The processor may be configured to generate the STSS feature map by integrating a dimension of the temporal offset for positions of the STSS feature vectors.

The processor may be configured to generate the STSS feature vectors by decreasing a dimension of the spatial offset and maintaining a dimension of the temporal offset for each position of the STSS tensor.

The processor may be configured to generate the STSS tensor based on a temporal offset and a spatial offset.

The processor may be configured to determine that the STSS feature vectors indicate a plurality of motion features for neighboring frames adjacent to each other on a time axis based on the temporal offset for each position of the STSS tensor.

The processor may be configured to generate the STSS feature vectors by applying, to the STSS tensor, a plurality of three-dimensional (3D) convolution layers for the temporal offset and the spatial offset.

The processor may be configured to generate the STSS feature vectors by applying a multi-layer perceptron (MLP) after flattening a dimension of the spatial offset for each position of the STSS tensor.

The STSS feature vectors may include a plurality of two-dimensional (2D) motion features for each position of the STSS tensor, and the STSS feature vectors may be generated by applying a soft-argmax to the dimensions of the temporal offset and the spatial offset for each position of the STSS tensor.

The processor may be configured to generate the STSS feature map by applying a 1×1×1 convolution layer after flattening, into the dimension of the temporal offset, a result obtained by applying, to the STSS feature vectors, convolution layers of which a receptive field may be expanded in a direction of the dimensions of the temporal offset and the spatial offset.

The processor may be configured to generate the STSS feature map by applying a 1×1×1 convolution layer after flattening, into a dimension of the temporal offset, a result obtained by applying an MLP to the STSS feature vectors.

The STSS feature map may have a same size as that of the video feature map.

The spatial cross-similarity maps may include motion information on forward motion, backward motion, and/or motion for first and second temporal ranges in frames adjacent to each other on a time axis selected based on the temporal offset.

The inference on the input video may be recognition and/or classification of an action and/or gesture in the input video.

The electronic device may further include an image sensor, where the video feature map may be based on image data captured by the image sensor.

In one general aspect, a method of operating an electronic device includes generating a spatio-temporal self-similarity (STSS) tensor including, for each position of a video feature map corresponding to an input video, based on a temporal offset and a spatial offset a spatial self-similarity map and spatial cross-similarity maps, wherein the generating is based on a temporal offset and a spatial offset, generating STSS feature vectors from the STSS tensor by decreasing a dimension of the spatial offset for each position of the STSS tensor, generating an STSS feature map based on the STSS feature vectors, and performing an inference on the input video based on a result of adding the STSS feature map to the video feature map.

The STSS feature vectors may indicate a plurality of motion features for neighboring frames adjacent to each other on a time axis based on the temporal offset for each position of the STSS tensor.

The generating of the STSS feature vectors may include applying, to the STSS tensor, a plurality of three-dimensional (3D) convolution layers of a neural network for the temporal offset and the spatial offset.

The performing of the inference on the input video may be based on further use of the neural network.

The generating of the STSS feature vectors may include applying a multi-layer perceptron (MLP) after flattening the dimension of the spatial offset for each position of the STSS tensor.

The STSS feature vectors may include a plurality of two-dimensional (2D) motion features for each position of the STSS tensor, and the generating the STSS feature vectors may include applying a soft-argmax to the dimensions of the temporal offset and the spatial offset for each position of the STSS tensor.

The generating the STSS feature map may include applying a 1×1×1 convolution layer after flattening, into the dimension of the temporal offset, a result obtained by applying, to the STSS feature vectors, convolution layers of which a receptive field may be expanded in a direction of the dimensions of the temporal offset and the spatial offset.

The STSS feature map may have a same size as a size of the video feature map, and the STSS feature map and the video feature map may be added through an elementwise addition.

The spatial cross-similarity maps may include motion information on forward, backward, short-term, and/or long-term motions in frames adjacent to each other on a time axis selected based on the temporal offset.

In one general aspect, embodiments include a non-transitory computer-readable storage medium storing instructions that, when executed by a processor, cause the processor to perform any one, any combination, or all operations and/or methods described herein.

In one general aspect, a method performed by a computing device includers providing a video to a convolutional neural network (CNN), wherein the CNN includes a convolution layer and a neural network, and wherein the video includes images, generating, by the convolution layer, based on the video, a first feature map including first regions and a second feature map including second regions, where the first feature map corresponds to a first image of the video and the second feature map corresponds to a second image of the video, generating a spatial-temporal feature map, wherein the spatial-temporal feature map includes similarities between the first regions and similarities between the first regions and the second regions, and using the neural network to generate an inference about the video based on the spatial-temporal feature map.

The method may further include generating a third feature map based on the first feature map and the spatial-temporal feature map, and generating the inference based on the third feature map.

The inference may be a classification of a motion recognized in the video.

The first feature map and the second feature map may be feature maps of a video feature map generated by the convolutional layer.

The method may further include performing a spatio-temporal self-similarity (STSS) transformation with respect to at least the first feature map and the second feature map to generate a STSS tensor, where the generating of the spatial-temporal feature map may be dependent on the STSS tensor.

The method may further include generating spatio-temporal self-similarity (STSS) feature vectors dependent on at least the first feature map and the second feature map, wherein the generating of the spatial-temporal feature map may be dependent on the STSS feature vectors.

Other features and aspects will be apparent from the following detailed description, the drawings, and the claims.

Figure 1:
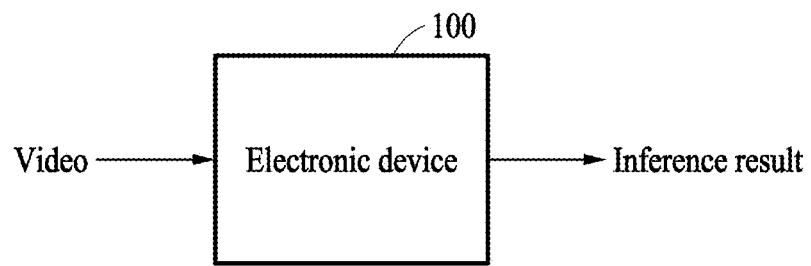
FIG. 1 illustrates an example of an electronic device, according to one or more embodiments.

Throughout the drawings and the detailed description, unless otherwise described, the same drawing reference numerals refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Spatio-temporal CNNs often fail to learn motion dynamics in video. Embodiments described herein may enhance spatio-temporal CNNs by using a rich and robust motion representation based on spatio-temporal self-similarity (STSS). Given a sequence of video frames, an STSS representation (e.g., a feature map) may represent each local region of a video frame as similarities to its neighbors in space (intra-frame) and time (inter-frame). An STSS representation (e.g., a feature map) generated by converting appearance features into relational values may improve a CNN's ability to recognize structural patterns in space and time. An STSS volume, or representation, may be leveraged by allowing a CNN to learn to extract an effective motion representation from video frames.

Embodiments of a machine learning block (e.g., a CNN layer or module) that leverages an STSS representation will be referred to herein as a SELFY block. A SELFY block may be inserted as a convolution layer in CNNs and may be trained end-to-end without necessarily requiring additional supervision. With a sufficient volume of the similarity neighborhood in space and time, the SELFY block may effectively capture long-term interaction and/or rapid motion in video, leading to robust recognition of actions, for example.

FIG. 1 illustrates an example of an electronic device 100, according to one or more embodiments. The electronic device 100 may process an input video to output an inference about the input video, for example, an action recognized in the input video.

In some embodiments, the electronic device 100 may perform video action-recognition by using computer vision and machine learning techniques, for example CNNs. The video action-recognition may recognize an action performed by a person captured in video. In some embodiments, the video action-recognition may recognize an action of a person appearing in a short video interval, for example five to ten seconds, by classifying the action (e.g., by determining probabilities of classes for the action). As described herein, the electronic device 100 may perform video action-recognition using STSS techniques. An STSS representation may represent relational structure of image features through calculations of temporal similarities of features and spatial similarities of features. In other embodiments the electronic device 100 may use STSS techniques to perform image classification, video action detection, video object tracking, video object segmentation, and the like.

The electronic device 100 may be, for example, a computing device (e.g., a cellular phone, a smartphone, a personal computer (PC), a tablet PC, an e-book device, a laptop, a server, etc.), a wearable device (e.g., a smartwatch, smart eyeglasses, a head-mounted display (HMD), smart clothes, etc.), a home appliance (e.g., a smart speaker, a smart television (TV), a smart refrigerator, etc.), a smart vehicle, a smart kiosk, an Internet of things (IoT) device, a walking assist device (WAD), a drone, a robot, a combination of such devices, or the like.

The STSS techniques may be combined with various video recognition models to implement various devices related to video recognition. For example, the STSS techniques may be applied to a video search device, a video surveillance device, a gesture recognition device, a human-robot interaction device, an autonomous driving and sports analysis device, or the like.

Figure 2:
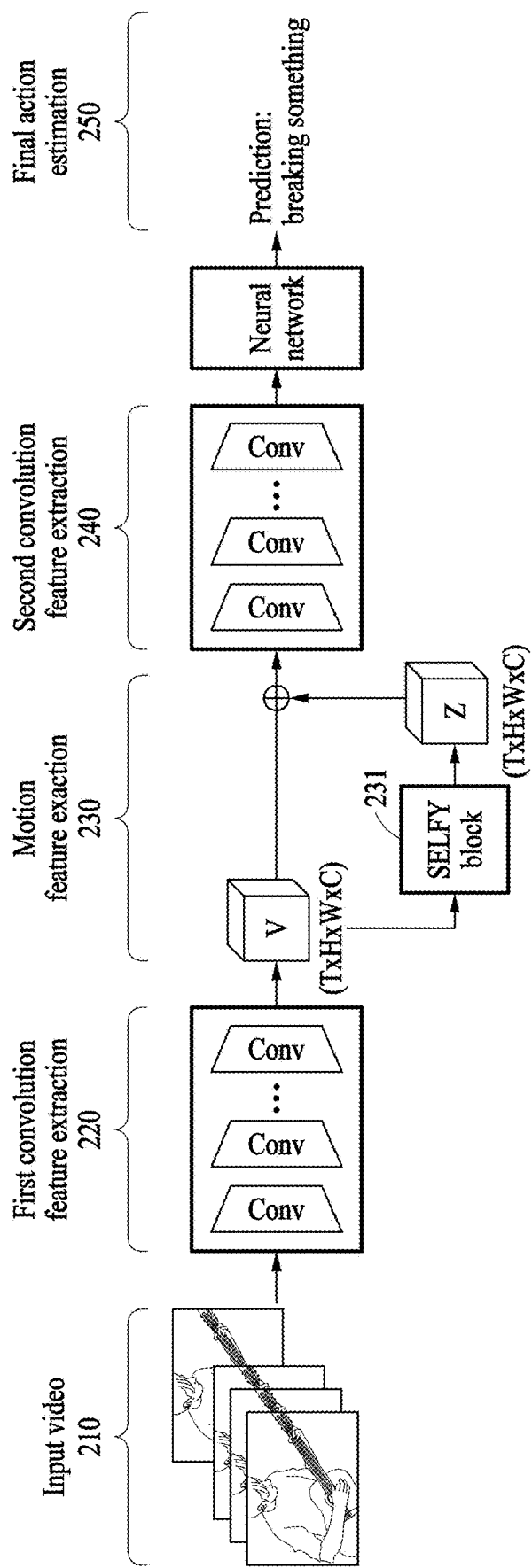
FIG. 2 illustrates a self-similarity (SELFY) block producing a spatio-temporal self-similarity (STSS) representation (Z), according to one or more embodiments.

FIG. 2 illustrates a SELFY block 231 producing an STSS representation (Z), according to one or more embodiments. Referring to FIG. 2, an electronic device may perform a video inference using the SELFY block 231, which may be a neural module configured to extract motion information from a video.

The electronic device may have convolution layers and the SELFY block 231 may be arranged among the convolution layers to augment information (e.g., a feature map) provided to, or by, a convolution layer of a CNN. That is, the SELFY block 231 may be included in a CNN that performs a video inference and the SELFY block 231 may facilitate end-to-end learning without necessarily requiring additional supervision. Specifically, the electronic device may generate a video feature map V by performing first convolution feature extraction 220 on an input video 210. The SELFY block 231 may be arranged to generate an STSS feature map Z by performing motion feature extraction 230 on the video feature map V. As described below with reference to FIG. 3, the SELFY block 231 may generate the STSS feature map Z by performing an STSS transformation, STSS feature extraction, and STSS feature integration. In an example, the SELFY block 231 may be implemented by a neural processor. Just as other layers of the example CNN may be implemented by the neural process, another neural processor, or another processor. The STSS feature map Z may be added to the video feature map V. The thus-enhanced video feature map V may be integrated into a downstream video processing neural network (e.g., a classifier) that is part of the CNN, either directly or via a second convolution feature extraction 240. The STSS feature map Z and the video feature map V may each be a four-dimensional (4D) feature map with dimensions of T×H×W×C (T frames, H height, W width, and C channels). As noted, in some embodiments, the electronic device may perform second convolution feature extraction 240 on a result of adding the STSS feature map Z to the video feature map V, and the output of the second convolution feature extraction 240 may be provided to a neural network that may, for example, perform final action-estimation 250, for example.

Figure 3:
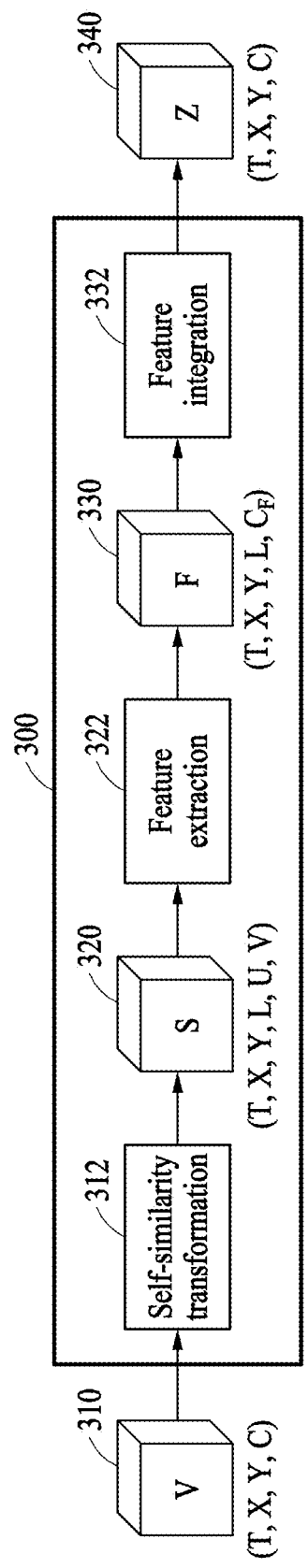
FIG. 3 illustrates example operations of a SELFY block, according to one or more embodiments.

FIG. 3 illustrates example operations of the SELFY block 300, according to one or more embodiments. The SELFY block 300 may receive a video feature map V 310 and perform an STSS transformation operation 312 to obtain an STSS tensor S 320. In addition, the SELFY block 300 may perform a feature extraction operation 322 to extract STSS feature vectors F 330 from the STSS tensor S 320. The SELFY block 300 may also perform a feature integration operation 332 to generate an STSS feature map Z 340 from the STSS feature vectors F 330. The SELFY block 300 may operate as a residual block by fusing the STSS feature map Z 340 into the video feature map V 310 using elementwise addition.

As noted, the SELFY block 300 may be an artificial neural module that learns STSS features to improve the video representation ability of a video-processing artificial neural network. An STSS tensor or feature map, for example, may be a relational descriptor for video images and may represent spatial similarities and temporal similarities of each local region (or element) of a given video image. That is, an STSS representation may, for a given local region of an image, represent similarities between the given local region and its spatial (intra-frame) neighboring local regions (spatial similarities), and it may represent similarities between the given local region and its temporal (inter-frame) neighboring local regions. The STSS techniques may transform appearance features into relational (similarity) values such that a learner may more effectively recognize a structural pattern of time and space.

Figure 4:
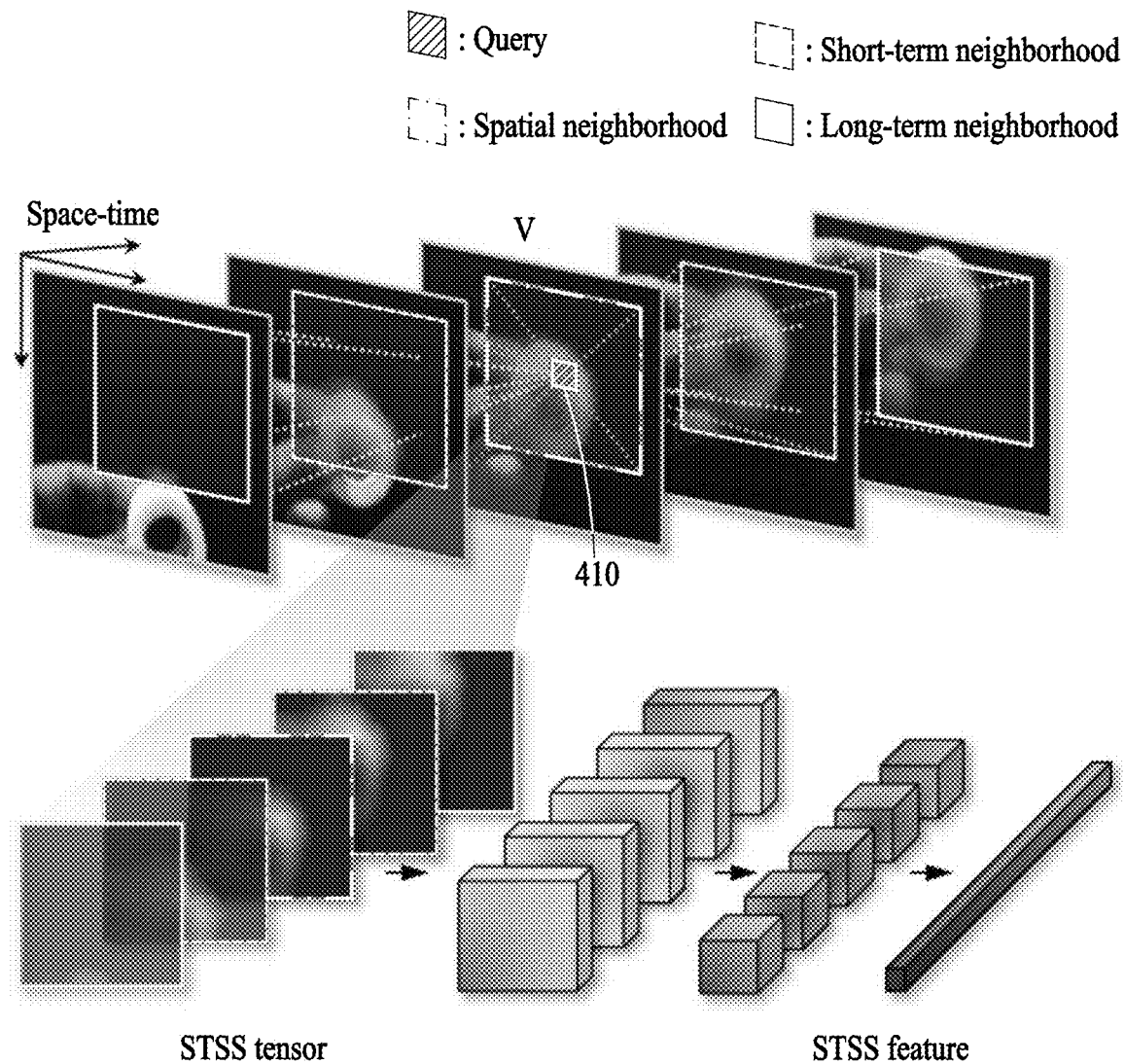
FIG. 4 illustrates a spatio-temporal neighborhood of a local region, and extracting an STSS feature therefrom, according to one or more embodiments.

FIG. 4 illustrates a spatio-temporal neighborhood of a local region, and extracting an STSS feature therefrom, according to one or more embodiments. The STSS feature map Z 340 may include such features for many or all local regions of the corresponding image, respectively. An STSS model may define each position or local region 410 of an image (or feature map) in terms of similarities with neighbors in time and space. Through the STSS transformation stage 312, a spatial self-similarity map for each local region 410 may be extracted for neighbors thereof present in the same frame, and a motion likelihood map may be extracted for a neighbors of each local region 410 present in one or more other frames (e.g., a short-term neighbor and a long-term neighbor). Depending on how it is implemented, the STSS model may represent motion to varying temporal extents. Through the STSS techniques, a rich motion representation may be extracted without necessarily requiring additional supervision.

Given a frame sequence, i.e., video, the STSS technique may indicate each local region's similarities to its neighbors in time and space. Appearance features may be transformed into relational (similarity) values, thereby enabling a learner to more readily recognize a spatio-temporal structural pattern. The SELFY block 300 may extract an effective motion representation using an entire volume of an STSS representation (e.g., tensor). In spatial and temporal terms, a sufficient volume of neighbors may be used to effectively identify a long-term interaction and/or rapid motion in a video and may thus enable robust action recognition (classification).

Figure 5:
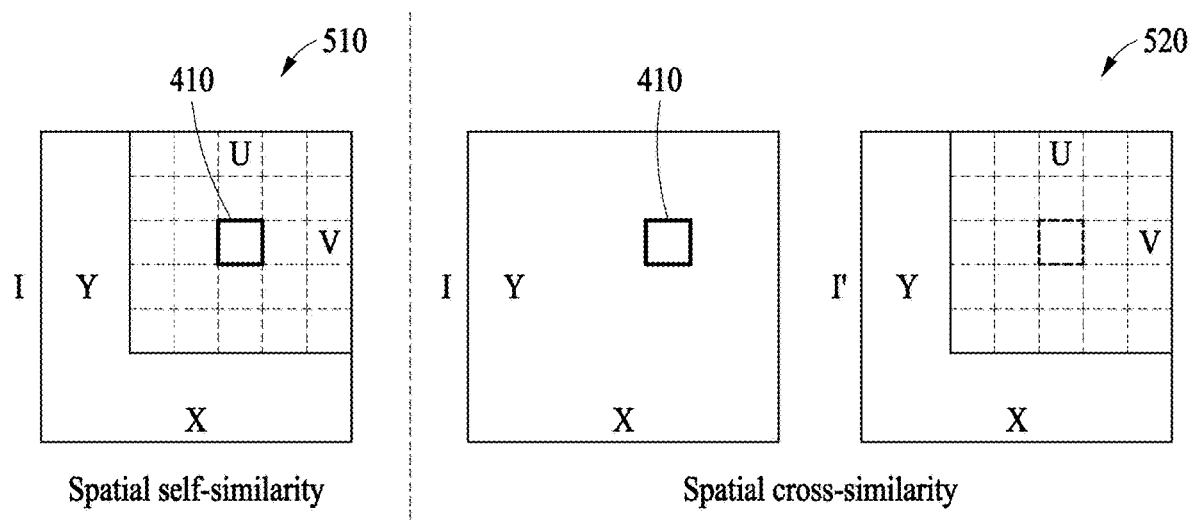
FIG. 5 illustrates an example of a spatial self-similarity neighborhood and a spatial cross-similarity neighborhood of a local region, according to one or more embodiments.
Figure 6:
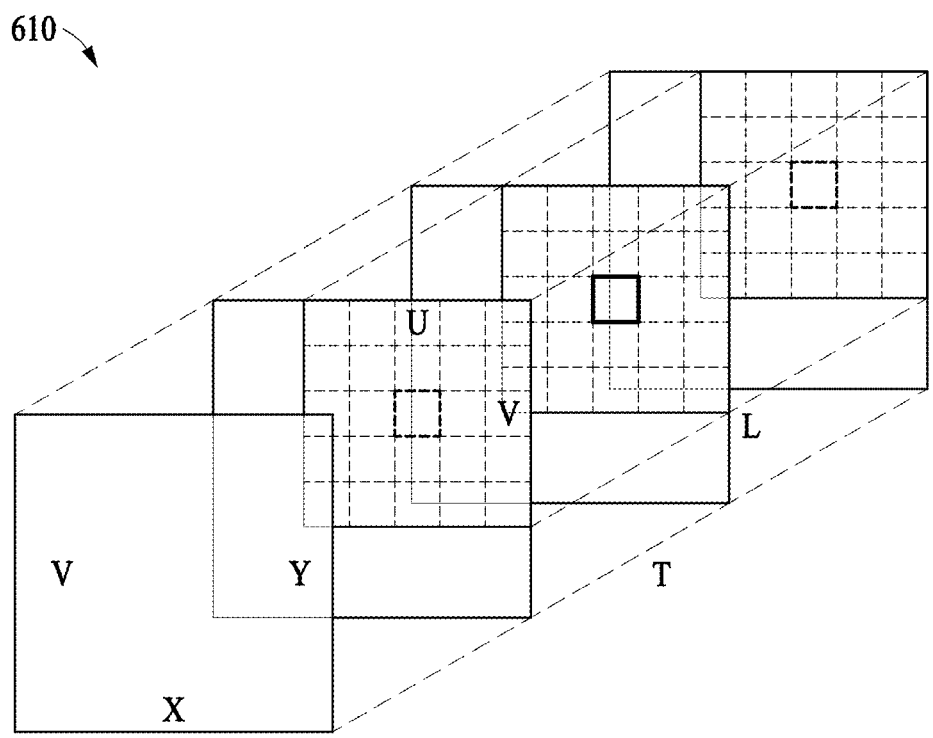
FIG. 6 illustrates an example of determining an STSS tensor S from a video feature map V, according to one or more embodiments.
Figure 7:
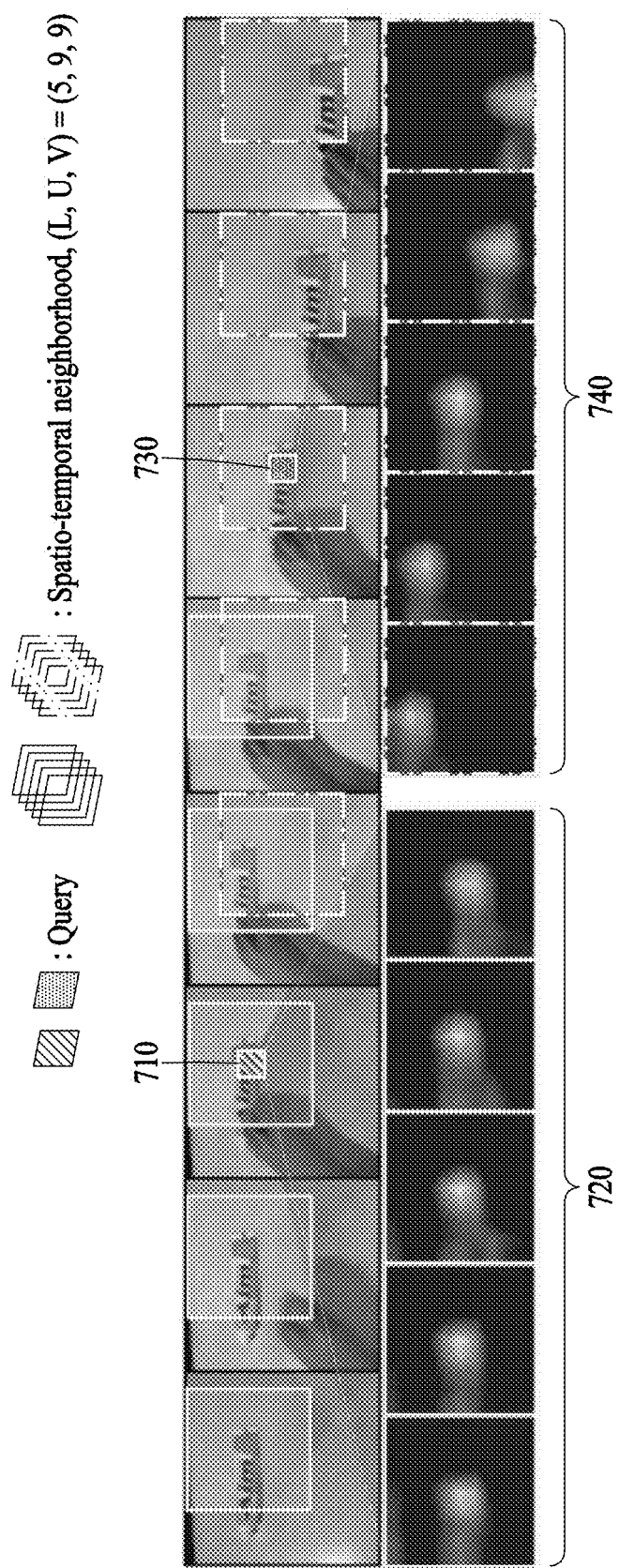
FIG. 7 illustrates examples of an STSS tensor determined based on local regions, according to one or more embodiments.

FIGS. 5 through 7 illustrate an example of determining an STSS tensor.

FIG. 5 illustrates an example of a spatial self-similarity neighborhood 510 and a spatial cross-similarity neighborhood 520 of a local region 410, according to one or more embodiments. An STSS model based on the neighborhoods is described next.

Given the image feature map $I \in \mathbb{R}^{X \times Y \times C}$, a 4D tensor $S \in \mathbb{R}^{X \times Y \times U \times V}$ (spatial self-similarities and spatial cross-similarities of the local regions in I) may be generated through an STSS transformation of I (e.g., the STSS transformation 312), and the spatial self-similarity 510 may be represented by Equation 1.

$$S_{x,y,u,v} = \text{sim}(I_{x,y}, I_{x+u,y+v}) \quad \text{Equation 1:}$$

In Equation 1, sim(·,·) denotes a similarity function (e.g., a cosine similarity function). The (x, y) terms denote coordinates of a local region, and the (u, v) terms denote a spatial offset from the coordinates of the local region. To assign locality, an offset may be limited to a neighborhood, for example, $(u, v) \in [-d_U, d_U] \times [-d_V, d_V]$. Thus, U may be $2d_U+1$ (e.g., $U=2d_U+1$), and V may be $2d_V+1$ (e.g., $V=2d_V+1$). Transforming a C-dimensional feature $I_{x,y}$ into a UV-dimensional relational feature $S_{x,y}$ may reduce or prevent a change in appearance and represent spatial structures of an image.

The STSS transformation for the spatial self-similarity neighborhood 510 may be closely related to the STSS transformation for the spatial cross-similarity neighborhood 520 (or a correlation), but over two different feature maps I, $I' \in \mathbb{R}^{X \times Y \times C}$, which may be represented by Equation 2.

$$S_{x,y,u,v} = \text{sim}(I_{x,y}, I'_{x+u,y+v}) \quad \text{Equation 2:}$$

The image feature map I may be a frame including a local region, and an image feature map I' may be a frame that temporally neighbors feature map I. For example, when a moving object is present in the two images, a spatial cross-similarity transformation may effectively capture motion information of the object.

FIG. 6 illustrates an example of determining an STSS tensor S 610 from a video feature map V, according to one or more embodiments.

As noted, the SELFY block 300 may be inserted in a video processing neural network and may receive a video feature map V of an intermediate state/layer and transform it into an STSS tensor S 610. For example, given a video feature map having T input frames, denoted as $V \in \mathbb{R}^{T \times X \times Y \times C}$, an STSS tensor $S \in \mathbb{R}^{T \times X \times Y \times L \times U \times V}$ with respect to V may be represented by Equation 3.

$$S_{t,x,y,l,u,v} = \text{sim}(V_{t,x,y}, V_{t+l,x+u,y+v}) \qquad \text{Equation 3:}$$

In Equation 3, the (t, x, y) terms denote coordinates of a local region, and the (l, u, v) terms denote a spatio-temporal offset of the local region. The sim( ) function may be any similarity function, for example, a cosine similarity function. In addition to limiting the locality of spatial offsets u and v, a temporal offset l may be limited to temporal neighbors. Thus, the spatio-temporal offset (l, u, v) may be limited to a range $(l, u, v) \in [-d_L, d_L] \times [-d_U, d_U] \times [-d_V, d_V]$. A spatio-temporal range of the STSS tensor S 610 may be $L=2d_L+1$, $U=2d_U+1$, and $V=2d_V+1$. The calculated STSS tensor S may include a spatial self-similarity map and $2d_L$ spatial cross-similarity maps according to the temporal offset I. Each of the cross-similarity maps may include likelihood information associated with a motion. For example, a partial tensor having a small temporal offset (e.g., I=±1) may collect motion information from neighboring frames, and a partial tensor having a larger temporal offset (e.g., I=±2) may collect motion information from a larger time range. Thus, the STSS tensor may include motion information, for example, forward, backward, short-term, and/or long-term motions.

FIG. 7 illustrates examples of an STSS tensor determined based on local regions, according to one or more embodiments. A first line in FIG. 7 represents eight successive frames included in a video. A spatio-temporal offset (L, U, V) is assumed as (5, 9, 9), for example.

For a first local region 710, a first STSS tensor 720 may be determined for a partial image (9, 9) with the first local region 710 from a reference frame including the first local region 710 and its neighboring frames (a total of five). In the first STSS tensor 720, brightness indicates similarity to the first local region 710.

For a second local region 730, a second STSS tensor 740 may be determined for a partial image (9, 9) with the second local region 730 from a reference frame including the second local region 730 and its neighboring frames (a total of five). Brightness in the second STSS tensor 740 indicates similarity to the second local region 730.

As noted above, an STSS tensor may be determined for some or all positions or local regions of a video feature map.

Figure 8:
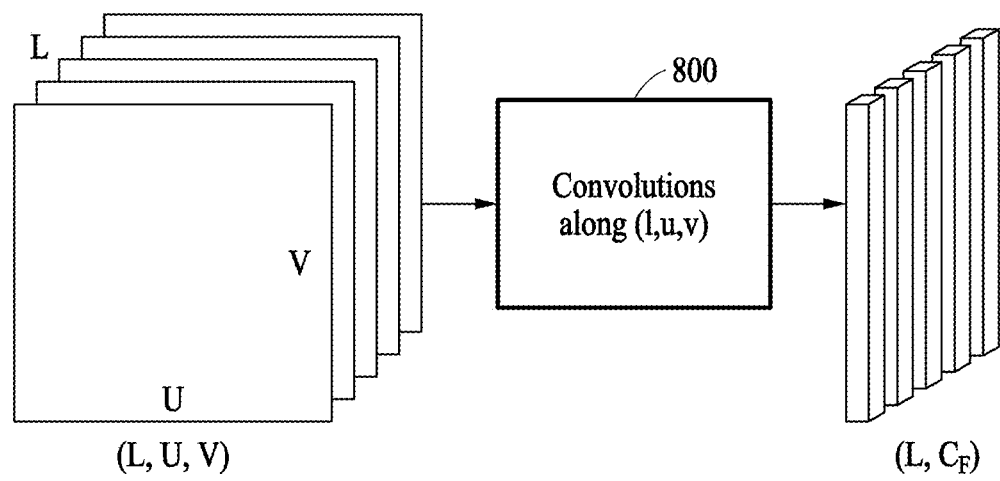
FIG. 8 illustrates convolutions transforming an STSS tensor into spatio-temporal feature vectors, according to one or more embodiments.
Figure 9:
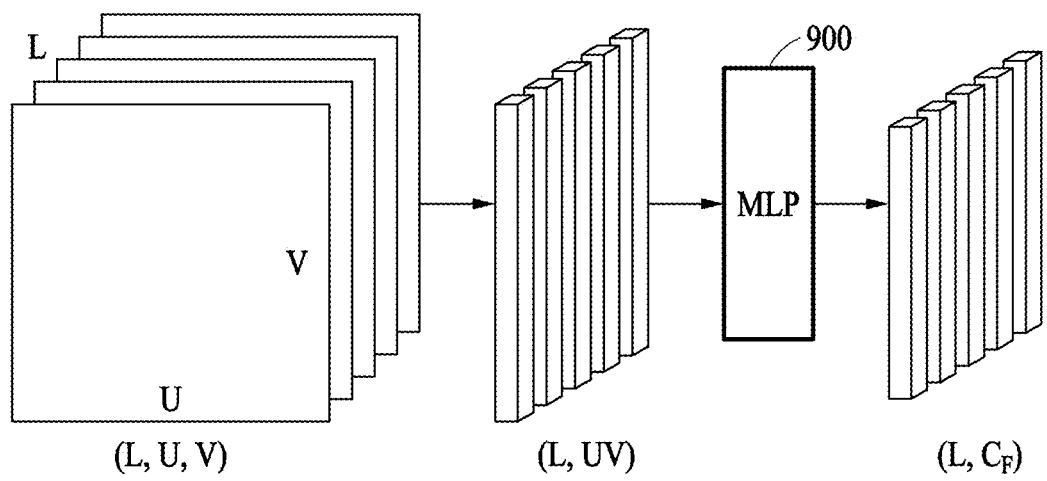
FIG. 9 illustrates a multi-layer perceptron (MLP) transforming an STSS tensor into STSS feature vectors, according to one or more embodiments.
Figure 10:
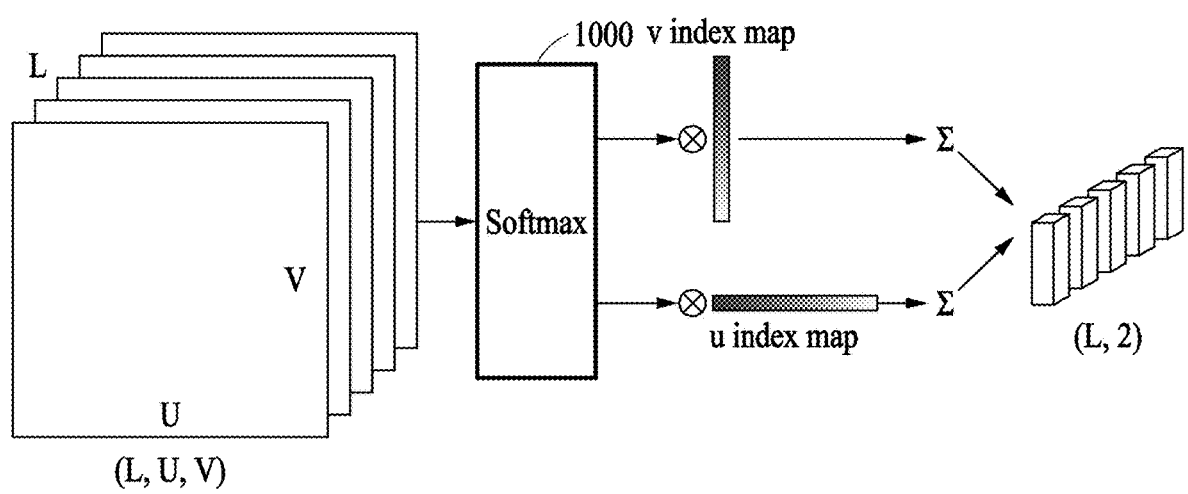
FIG. 10 illustrates a soft-argmax algorithm transforming an STSS tensor into STSS feature vectors, according to one or more embodiments.

FIGS. 8 through 10 illustrate an example of determining STSS feature vectors.

A $C_F$-dimensional feature for each spatio-temporal position (t, x, y) and a temporal offset I may be extracted from an STSS tensor $S \in \mathbb{R}^{T \times X \times Y \times L \times U \times V}$, and STSS feature vectors $F \in \mathbb{R}^{T \times X \times Y \times L \times C_F}$ may be determined therefrom. This may be performed based on a transformation on temporal and spatial offsets. In the case of a transformation from an STSS tensor S into STSS feature vectors F, the L dimension may be used to extract motion information throughout different temporal offsets. As described next with reference to FIGS. 8-10, the transformation into the STSS feature vectors F may be performed based on a convolution, a multi-layer perceptron (MLP), or a soft-argmax, for example.

FIG. 8 illustrates convolutions 800 transforming an STSS tensor into spatio-temporal feature vectors, according to one or more embodiments. STSS feature vectors F may be determined from an STSS tensor S based on convolutions 800 along (l,u,v). Regarding the convolutions 800, an STSS feature extraction operation may extract a $C_F$-dimensional STSS feature vector for each position (t, x, y) from calculated $S \in \mathbb{R}^{T \times X \times Y \times L \times U \times V}$ and thereby form a tensor in the form of $F \in \mathbb{R}^{T \times X \times Y \times L \times C_F}$. For the STSS feature extraction, a convolution layer g(·) that may effectively learn a structural pattern in an STSS neighborhood may be used. That is, a convolution kernel for a volume (L, U, V) of the STSS tensor S may be learned. When the STSS tensor S is a seven-dimensional (7D) tensor in the form of $S \in \mathbb{R}^{T \times X \times Y \times L \times U \times V \times 1}$, the convolution layer g(·) having a multi-channel convolution kernel of $K_c \in \mathbb{R}^{1 \times 1 \times 1 \times L_n \times U_n \times V_n \times C \times C'}$ may be represented by Equation 4.

$$g(S) = \text{ReLU}(\text{Conv}(S, K_c)) \qquad \text{Equation 4:}$$

When passing the STSS tensor S through convolutions 800, the (U, V) dimension may be gradually reduced, and thus generate the STSS feature vectors F in the form of $F \in \mathbb{R}^{T \times X \times Y \times L \times C_F}$. Unlike the (U, V) dimension, in some embodiments the L dimension may be maintained rather than being reduced, thereby minimizing a temporal information loss.

That is, a final $\mathbb{R}^{T \times X \times Y \times L \times 1 \times 1 \times C_F}$ may be determined by gradually downsampling (U, V) from $\mathbb{R}^{T \times X \times Y \times L \times U \times V \times 1}$ and expanding channels through a multi-convolution with strides. Maintaining a fine temporal resolution may be effective in capturing fine motion information, and thus the L dimension may be maintained. After the STSS tensor S is reshaped, a 3D convolution may be applied according to an (l, u, v) dimension of the subsequently reshaped S. An STSS feature extraction using N convolution layers may be represented by Equation 5, in which ∘ denotes function composition.

$$F = (g_n \circ g_{n-1} \circ \ldots \circ g_1)(S) \qquad \text{Equation 5:}$$

In some cases, a convolution may be more effective than an MLP in learning a structural pattern in an STSS tensor.

FIG. 9 illustrates an MLP 900 transforming an STSS tensor into STSS feature vectors, according to one or more embodiments. STSS feature extraction may be performed by the MLP 900, which transforms a self-similarity value into a feature. An example embodiment may flatten a (U, V) volume of the STSS tensor S into a UV-dimensional vector and then apply the MLP 900. A perceptron f(·) applied to the reshaped tensor $S \in \mathbb{R}^{T \times X \times Y \times L \times UV}$ may be represented by Equation 6.

$$f(S) = \text{ReLU}(S \times_5 W_\phi) \qquad \text{Equation 6:}$$

In Equation 6, $\times_5$ denotes an n-mode tensor product, $W_\phi \in \mathbb{R}^{C \times UV}$ may be a perceptron parameter, and an output may be $f(S) \in \mathbb{R}^{T \times X \times Y \times L \times C'}$. Thus, the MLP-based feature extraction may be implemented, for example, as Equation 7.

$$F = (f_n \circ f_{n-1} \circ \ldots \circ f_1)(S) \qquad \text{Equation 7:}$$

Equation 7 may be used to calculate a feature tensor $F \in \mathbb{R}^{T \times X \times Y \times L \times C_F}$. This method may enable encoding of displacement information and direct access to similarity values, and in some cases may thus be more flexible and effective compared to soft-argmax based feature extraction described hereinafter. The MLP-based feature extraction may be effective in learning motion distributions.

FIG. 10 illustrates a soft-argmax algorithm 1000 transforming an STSS tensor into STSS feature vectors, according to one or more embodiments. Soft-argmax based feature extraction may calculate explicit displacement fields using spatial cross-similarity. Although argmax(u,v) may extract a displacement field by indexing a position with a highest similarity, differentiation may not be possible and thus a gradient may not be transferred during backpropagation of a neural network. Unlike argmax, soft-argmax may aggregate displacement vectors using a softmax weight and may thus transfer the gradient during backpropagation of the neural network. The soft-argmax based feature extraction may be represented by Equation 8.

$$F_{t,x,y,l} = \sum_{u,v} \frac{\exp(S_{t,x,y,l,u,v}/\tau)}{\sum_{u',v'} \exp(S_{t,x,y,l,u',v'}/\tau)}[u;v]$$

Equation 8

Through Equation 8 above, STSS feature vectors $F \in \mathbb{R}^{T \times X \times Y \times L \times 2}$ may be generated. A temperature factor $\tau$ may adjust a softmax distribution, and $\tau$ may be 0.01, for example.

Figure 11:
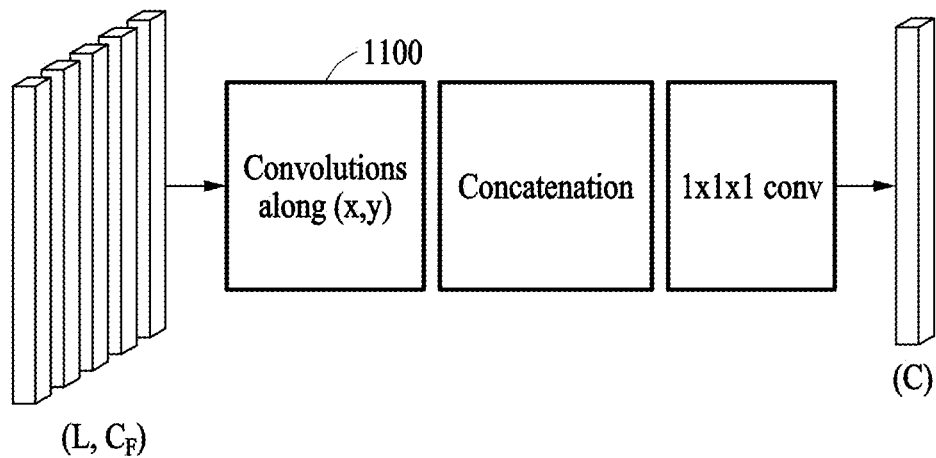
FIG. 11 illustrates an STSS feature map Z being generated from STSS feature vectors F based on a convolution, according to one or more embodiments.
Figure 12:
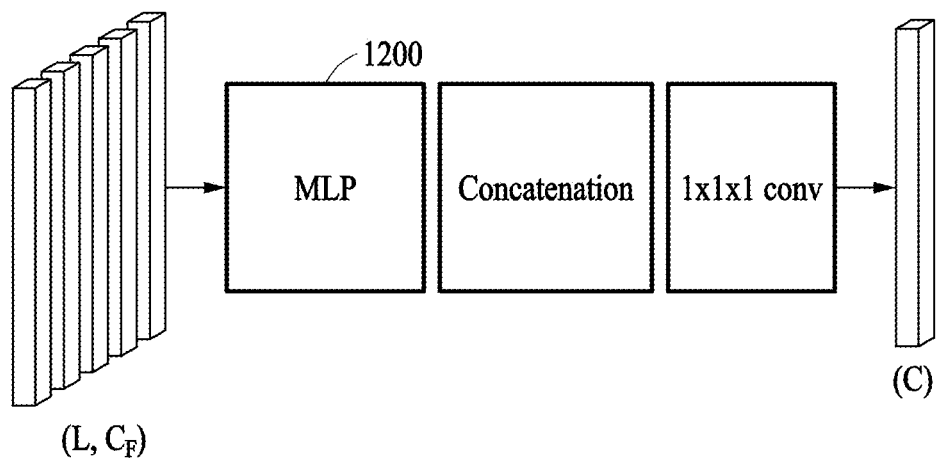
FIG. 12 illustrates an MLP generating an STSS feature map Z from STSS feature vectors, according to one or more embodiments.

FIGS. 11 and 12 illustrate an example of determining an STSS feature map.

An STSS feature map Z may be determined by integrating a dimension of a temporal offset for each position of STSS feature vectors F. The STSS feature map Z may have volume dimensions, e.g., (T, X, Y, C) (e.g., T frames, X and Y dimensions, and C channels) that can be fed back to an original stream (e.g., added to the feature map V 310). A transformation from the STSS feature vectors F into the STSS feature map Z may be performed based on either a convolution or an MLP, for example, as described next with reference to FIGS. 11 and 12.

FIG. 11 illustrates an STSS feature map Z being generated from STSS feature vectors F based on a convolution 1100, according to one or more embodiments.

Through an STSS feature integration, an STSS feature map $Z \in \mathbb{R}^{T \times X \times Y \times L \times C}$ may be generated by integrating STSS feature vectors $F \in \mathbb{R}^{T \times X \times Y \times L \times C_F}$. For this, a convolution layer $h(\cdot)$ may be used, and a convolution layer having a multi-channel kernel in the form of $K_i \in \mathbb{R}^{T_n \times X_n \times Y_n \times 1 \times C_F \times C_{F'}}$ may be represented by Equation 9.

$$h(S) = \text{ReLU}(\text{Conv}(F, K_i))$$

Equation 9

A convolution layer $h(\cdot)$ of this type may effectively integrate the STSS feature vectors F while expanding a receptive field in the (t, x, y)-dimensional direction. A feature map $F^* \in \mathbb{R}^{T \times X \times Y \times L \times C'_F}$ generated by passing n convolution layers may be calculated as represented by Equation 10.

$$F^* = (h_n \circ h_{n-1} \circ \ldots \circ h_1)(F)$$

Equation 10:

A final STSS feature map Z may be generated by flattening an (L, $C_F$) matrix of the calculated F* into an $LC_F$-dimensional vector and applying a 1×1×1 convolution layer. The 1×1×1 convolution layer may be used to adjust the size of a channel dimension to integrate different temporal offset information and add the STSS feature map Z to a video feature map V. The STSS feature map Z may be represented by Equation 11.

$$Z = \text{ReLU}(F^* \times_4 W_\theta)$$

In Equation 11, $X_4$ denotes an n-mode tensor product, and $W_\theta \in \mathbb{R}^{C \times LC^*_F}$ may be the kernel of a 1×1×1 convolution layer. The calculated final STSS feature map Z may be added, elementwise, to the video feature map V, and thus the SELFY block may operate as a residual block for motion learning.

FIG. 12 illustrates an MLP 1200 generating an STSS feature map Z from STSS feature vectors, according to one or more embodiments. An STSS feature integration may be performed using the MLP 1200. The final STSS feature map Z may be generated by flattening an (L, $C_F$) matrix (a result obtained by applying the MLP 1200 to the STSS feature vectors) into an $LC_F$-dimensional vector, and then applying a 1×1×1 convolution layer. The 1×1×1 convolution layer may be used to adjust the size of a channel dimension, to integrate different temporal offset information, and to add the STSS feature map Z to a video feature map V. The calculated final STSS feature map Z may be added, element-wise, to the video feature map V, and thus a SELFY block may operate as a residual block for motion learning.

Figure 13:
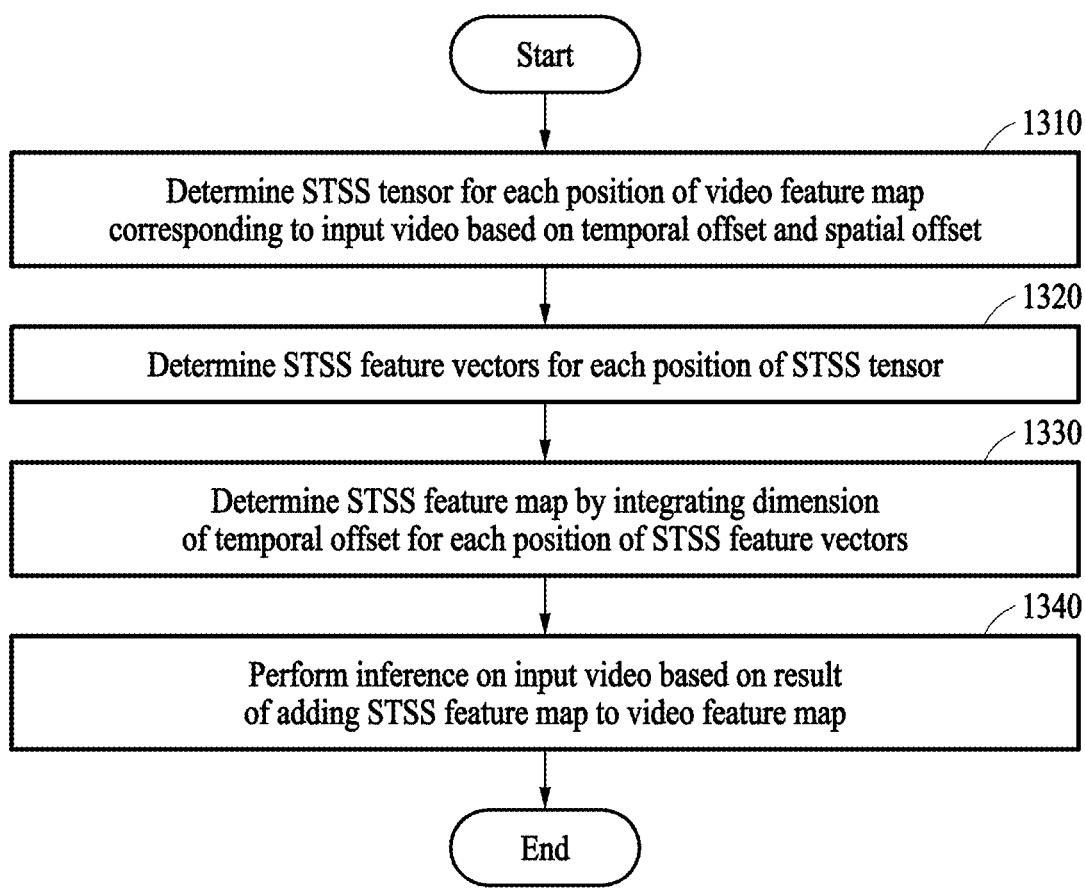
FIG. 13 illustrates an example of a method of operating an electronic device, according to one or more embodiments.

FIG. 13 illustrates an example of a method of operating an electronic device, according to one or more embodiments.

Operations to be described hereinafter may be performed in varying order. For example, the operations may be performed in different orders, and at least two of the operations may be performed in parallel. Operations 1310 through 1340 may be performed by at least one component (e.g., a processor) of an electronic device of an example embodiment.

In operation 1310, the electronic device may determine an STSS tensor including a spatial self-similarity map and a plurality of spatial cross-similarity maps for each position in a video feature map corresponding to an input video. The STSS tensor may be determined based on a temporal offset and a spatial offset.

In operation 1320, the electronic device may determine STSS feature vectors from the STSS tensor by decreasing a dimension of the spatial offset and maintaining a dimension of the temporal offset for each position or region of the STSS tensor. The electronic device may determine the STSS feature vectors indicating a plurality of motion features for neighboring frames adjacent to each other (on a time axis) based on the temporal offset for each position of the STSS tensor. For example, the electronic device may determine the STSS feature vectors by applying, to the STSS tensor, one or more 3D convolution layers for the temporal offset and the spatial offset. In addition, the electronic device may determine the STSS feature vectors using an MLP or a soft-argmax.

In operation 1330, the electronic device may determine an STSS feature map by integrating the dimension of the temporal offset for each position of the STSS feature vectors. For example, the electronic device may determine the STSS feature map by applying a 1×1×1 convolution layer after flattening, into the dimension of the temporal offset, a result obtained by applying, to the STSS feature vectors, the convolution layers by which a receptive field is expanded in a direction of the dimensions of the spatial offset and the temporal offset. In addition, the electronic device may determine the STSS feature map using the MLP.

In operation 1340, the electronic device may perform an inference on the input video based on a result of adding the STSS feature map to the video feature map. The STSS feature map may have the same size as that of the video feature map. The electronic device may add the STSS feature map and the video feature map through an element-wise addition. The inference on the input video may include recognition and/or classification of an action and/or gesture in the input video.

Figure 14:
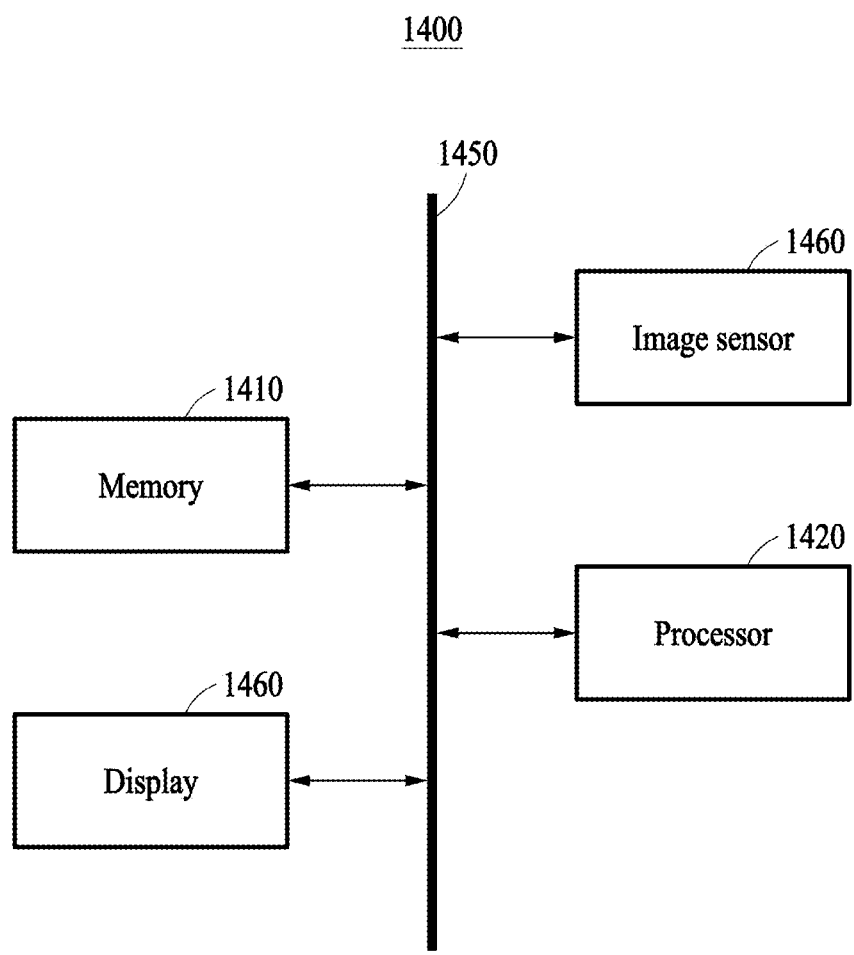
FIG. 14 illustrates an example of an electronic device, according to one or more embodiments.

FIG. 14 illustrates an example of an electronic device, according to one or more embodiments. An electronic device 1400 of an example embodiment may include a memory 1410 and a processor 1420. The memory 1410 and the processor 1420 may communicate with each other through a bus, a peripheral component interconnect express (PCIe), and/or a network on a chip (NoC), represented by reference number 1450. The electronic device may also include an image sensor 1460 and a display 1470. In some embodiments, the image data mentioned above may be derived from the image sensor 1460. In some embodiments, the display 1470 may display renderings of graphics generated by the STSS techniques described herein.

The memory 1410 may include a computer-readable instruction. When the instruction stored in the memory 1410 is executed in the processor 1420, the processor 1420 may perform the operations described herein. The memory 1410 may be a volatile memory or a nonvolatile memory.

The processor 1420 may be a device that executes instructions or programs or controls the electronic device 1400 and include, for example, a central processing unit (CPU) and/or a graphics processing unit (GPU), an accelerator, or the like. The processor 1420 may determine an STSS tensor including a spatial self-similarity map and a plurality of spatial cross-similarity maps for each position of a video feature map corresponding to an input video based on a temporal offset and a spatial offset, determine STSS feature vectors from the STSS tensor by decreasing a dimension of the spatial offset and maintaining a dimension of the temporal offset for each position of the SSTS tensor, determine an STSS feature map by integrating the dimension of the temporal offset for each position of the STSS feature vectors, and perform an inference on the input video based on a result of adding the STSS feature map to the video feature map.

In addition, the electronic device 1400 may perform or process the operations described above.

The electronic device, and other devices, apparatuses, units, modules, and components described herein with respect to FIGS. 1-14 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EE- PROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device comprising:
a processor; and
a memory comprising instructions that when executed by the processor configure the processor to:
generate, for respective positions of a video feature map corresponding to an input video, a spatio-temporal self-similarity (STSS) tensor comprising a spatial self-similarity map and spatial cross-similarity maps, wherein the spatial self-similarity map comprises similarities between a position in a frame of the input video and neighboring regions in the frame, and the spatial cross-similarity maps comprise similarities between the position in the frame and respectively corresponding positions in other frames of the input video;
generate STSS feature vectors from the STSS tensor;
generate an STSS feature map based on the STSS feature vectors; and
perform an inference on the input video based on the STSS feature map.

2. The electronic device of claim 1, where the processor is configured to perform the inference is based on adding the STSS feature map to the video feature map.

3. The electronic device of claim 1, wherein the processor is configured to generate the STSS feature map by integrating a dimension of a temporal offset for positions of the STSS feature vectors.

4. The electronic device of claim 1, wherein the processor is configured to generate the STSS feature vectors by decreasing a dimension of a spatial offset and maintaining a dimension of a temporal offset for each position of the STSS tensor.

5. The electronic device of claim 1, wherein the processor is configured to generate the STSS tensor based on a temporal offset and a spatial offset.

6. The electronic device of claim 1, wherein the processor is configured to:
determine that the STSS feature vectors indicate a plurality of motion features for neighboring frames adjacent to each other on a time axis based on a temporal offset for each position of the STSS tensor.

7. The electronic device of claim 1, wherein the processor is configured to:
generate the STSS feature vectors by applying, to the STSS tensor, a plurality of three-dimensional (3D) convolution layers for a temporal offset and a spatial offset.

8. The electronic device of claim 1, wherein the processor is configured to:
generate the STSS feature vectors by applying a multi-layer perceptron (MLP) after flattening a dimension of a spatial offset for each position of the STSS tensor.

9. The electronic device of claim 1, wherein the STSS feature vectors comprise a plurality of two-dimensional (2D) motion features for each position of the STSS tensor, and wherein the STSS feature vectors are generated by applying a soft-argmax to dimensions of a temporal offset and a spatial offset for each position of the STSS tensor.

10. The electronic device of claim 1, wherein the processor is configured to:
generate the STSS feature map by applying a 1×1×1 convolution layer after flattening, into a dimension of a temporal offset, a result obtained by applying, to the STSS feature vectors, convolution layers of which a receptive field is expanded in a direction of dimensions of a temporal offset and a spatial offset.

11. The electronic device of claim 1, wherein the processor is configured to:
generate the STSS feature map by applying a 1×1×1 convolution layer after flattening, into a dimension of a temporal offset, a result obtained by applying a multi-layer perceptron (MLP) to the STSS feature vectors.

12. The electronic device of claim 1, wherein the STSS feature map has a same size as that of the video feature map.

13. The electronic device of claim 1, wherein the spatial cross-similarity maps comprise motion information on forward motion, backward motion, and/or motion for first and second temporal ranges in frames adjacent to each other on a time axis selected based on a temporal offset.

14. The electronic device of claim 1, wherein the inference on the input video comprises recognition and/or classification of an action and/or gesture in the input video.

15. The electronic device of claim 1, further comprising an image sensor, and wherein the video feature map is based on image data captured by the image sensor.

16. A processor-implemented method of operating an electronic device, comprising:
generating, for respective portions of a video feature map corresponding to an input video, a spatio-temporal self-similarity (STSS) tensor comprising a spatial self-similarity map and spatial cross-similarity maps, wherein the spatial self-similarity map comprises similarities between a position in a frame of the input video and neighboring regions in the frame, and the spatial cross-similarity maps comprise similarities between the position in the frame and respectively corresponding positions in other frames of the input video;

generating STSS feature vectors from the STSS tensor by decreasing a dimension of a spatial offset for each position of the STSS tensor;

generating an STSS feature map based on the STSS feature vectors; and performing an inference on the input video based on a result of adding the STSS feature map to the video feature map.

17. The method of claim 16, wherein the STSS feature vectors indicate a plurality of motion features for neighboring frames adjacent to each other on a time axis based on a temporal offset for each position of the STSS tensor.

18. The method of claim 16, wherein generating the STSS feature vectors comprises:
applying, to the STSS tensor, a plurality of three-dimensional (3D) convolution layers of a neural network for a temporal offset and the spatial offset.

19. The method of claim 16, wherein the generating the STSS feature vectors comprises:
applying a multi-layer perceptron (MLP) after flattening the dimension of a spatial offset for each position of the STSS tensor.

20. The method of claim 16, wherein the STSS feature vectors comprise a plurality of two-dimensional (2D) motion features for each position of the STSS tensor, and wherein the generating the STSS feature vectors comprises:
applying a soft-argmax to dimensions of a temporal offset and the spatial offset for each position of the STSS tensor.

21. The method of claim 16, wherein the generating the STSS feature map comprises:
applying a 1×1×1 convolution layer after flattening, into a dimension of a temporal offset, a result obtained by applying, to the STSS feature vectors, convolution layers of which a receptive field is expanded in a direction of the dimensions of a temporal offset and the spatial offset.

22. The method of claim 16, wherein the STSS feature map has a same size as a size of the video feature map, and wherein the STSS feature map and the video feature map are added through an elementwise addition.

23. The method of claim 16, wherein the spatial cross-similarity maps comprise motion information on forward, backward, short-term, and/or long-term motions in frames adjacent to each other on a time axis selected based on a temporal offset.

24. A non-transitory computer-readable storage medium storing instructions that, when executed by a processor, cause the processor to perform the method of claim 16.

* * * * *